United States Patent
Lele et al.

(10) Patent No.: US 11,620,126 B2
(45) Date of Patent: Apr. 4, 2023

(54) DYNAMIC MULTIPLE REPOSITORY PACKAGE MANAGEMENT THROUGH CONTINUOUS INTEGRATION

(71) Applicant: Baker Hughes Holdings LLC, Houston, TX (US)

(72) Inventors: Shreyas Lele, Mumbai (IN); Karan Sonawane, Mumbai (IN); Mangesh Dashmukhe, Pune (IN)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 17/232,881

(22) Filed: Apr. 16, 2021

(65) Prior Publication Data

US 2022/0334830 A1 Oct. 20, 2022

(51) Int. Cl.
*G06F 8/71* (2018.01)
*G06F 8/30* (2018.01)
*G06F 8/41* (2018.01)
*G06F 8/60* (2018.01)

(52) U.S. Cl.
CPC ............... *G06F 8/71* (2013.01); *G06F 8/30* (2013.01); *G06F 8/44* (2013.01); *G06F 8/60* (2013.01)

(58) Field of Classification Search
CPC ........ G06F 8/30; G06F 8/33; G06F 8/40–447; G06F 8/60–65; G06F 8/70; G06F 8/71; G06F 21/57–577
USPC .................. 717/110–113, 120–123, 140–161
See application file for complete search history.

(56) References Cited

U.S. PATENT DOCUMENTS

| | | | |
|---|---|---|---|
| 10,979,440 B1* | 4/2021 | Kalika | G06F 21/51 |
| 2014/0201236 A1* | 7/2014 | Adler | G06F 16/245 |
| | | | 707/769 |
| 2020/0019388 A1* | 1/2020 | Jaeger | G06F 9/5077 |

OTHER PUBLICATIONS

Debroy, Vidroha, et al., Overcoming Challenges With Continuous Integration and Deployment Pipelines, IEEE Software, May-Jun. 2020, 9 pages, [retrieved on Feb. 6, 23], Retrieved from the Internet: <URL:http://ieeexplore.IEEE.org/>.*

Microservices, Wikipedia, Mar. 2020, 11 pages, [retrieved on Feb. 6, 23], Retrieved from the Internet: <URL:https://web.archive.org/web/20200304234230/https://en.wikipedia.org/wiki/Microservices>.*

* cited by examiner

*Primary Examiner* — Geoffrey R St Leger
(74) *Attorney, Agent, or Firm* — Mintz Levin Cohn Ferris Glovsky and Popeo, PC

(57) ABSTRACT

In one implementation, a method includes receiving data characterizing a notification indicative of modification to a first source code of a first layer of a software architecture. The first layer is stored in a first repository of a plurality of repositories of a microservice. The method further includes generating a modified first package including a first computer-executable code generated by at least compiling the first source code and assigning a unique first name to the modified first package. The method further includes transmitting an instruction to a repository manager of a package repository to store the modified first package with the assigned first name in the package repository. The method also includes generating a first modified container image including the modified first package.

21 Claims, 2 Drawing Sheets

DYNAMIC MULTIPLE REPOSITORY PACKAGE MANAGEMENT THROUGH CONTINUOUS INTEGRATION

BACKGROUND

Microservice (or microservice architecture) is an architectural style that structures an application as a collection of layers (or services). It can allow developers to design applications by decomposing the application into layers that implement specific functions. The microservice architecture can be suitable for rapid, frequent and reliable delivery of applications that are large and/or complex. The various layers can communicate with each other through standardized application programming interfaces (APIs).

SUMMARY

Various aspects of the disclosed subject matter may provide one or more of the following capabilities.

In one implementation, a method includes receiving data characterizing a notification indicative of modification to a first source code of a first layer of a software architecture. The first layer is stored in a first repository of a plurality of repositories of a microservice. The method further includes generating a modified first package including a first computer-executable code generated by at least compiling the first source code and assigning a unique first name to the modified first package. The method further includes transmitting an instruction to a repository manager of a package repository to store the modified first package with the assigned first name in the package repository. The method also includes generating a first modified container image including the modified first package.

One or more of the following features can be included in any feasible combination.

In some implementations, the method further includes executing the first modified container image. The first modified container image further includes a microservice layer including a microservice source code configured to execute source codes in a plurality of packages in the modified container image by at least communicating between one or more packages of the plurality of packages. The plurality of packages includes the modified first package.

In some implementations, the method further includes retrieving at least a second source code of a second layer of the plurality of layers. The method also includes generating a modified second package including a second computer-executable code generated by at least compiling the second source code and assigning a unique second name to the modified second package. The method further includes transmitting an instruction to the repository manager of the package repository to store the modified second package with the assigned second name in the package repository. The method also includes generating a second modified container image including the modified second package and the modified first package.

In some implementations, the method further includes receiving data characterizing a second notification indicative of modification to the second source code of the second layer of the software architecture. In some implementations, the software architecture includes a plurality of layers including the first layer and the second layer. The first layer is stored in a first repository of the plurality of repositories and the second layer is stored in a second repository of the plurality of repositories.

In some implementations, the package repository is configured to store packages associated with each of the plurality of layers of the software architecture. In some implementations, source code of each of the plurality of repositories is configured to be independently compiled. In some implementations, the method further includes retrieving at least the first source code of the first layer. In some implementations, the software architecture is configured to be executed on a plurality of compute nodes.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

These and other capabilities of the disclosed subject matter will be more fully understood after a review of the following figures, detailed description, and claims.

BRIEF DESCRIPTION OF THE FIGURES

These and other features will be more readily understood from the following detailed description taken in conjunction with the accompanying drawings, in which.

DETAILED DESCRIPTION

Figure 1:
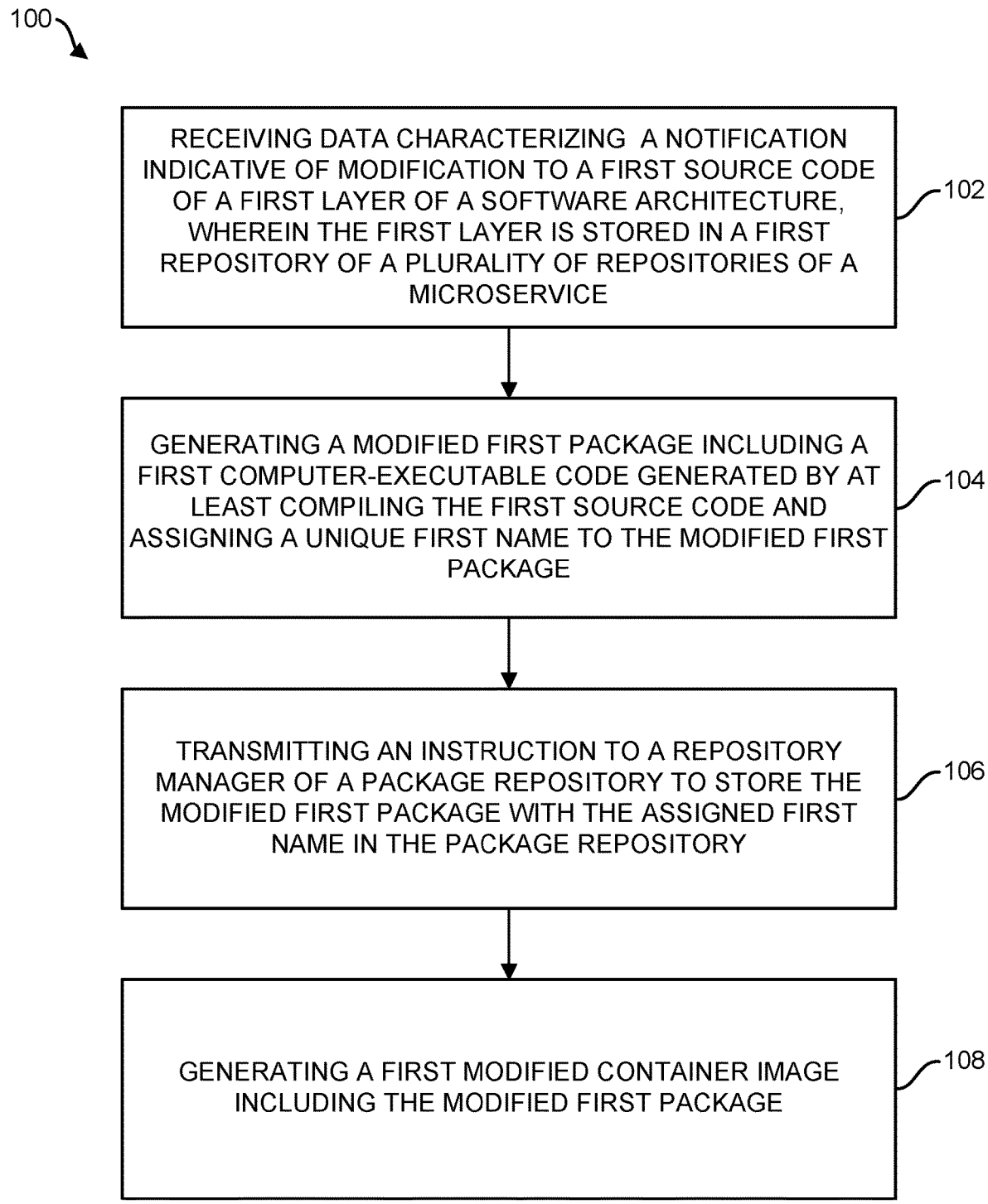
FIG. 1 is a flow chart of an exemplary method for generating a modified container image based on modification to a layer of a microservice architecture.

Microservice or microservice architecture can allow for software development by dividing a software architecture into multiple layers or modules (e.g., based on functionality). The source code of the various layers can be interdependent. For example, a first source code (e.g., a class) in a first layer can be dependent on (e.g., call upon) a second source code (e.g., a class) in a second layer, and changes made to the first source code can affect the second source code and vice-versa. The various layers can be stored in the same data repository and can be compiled as a unit to generate a package. This form of dependency can be referred to as tight-coupling. Tight coupling between the layers of the software architecture can render the process of software development on the microservice inefficient. For example, developers may not be able to independently work on the source code of the different layers of a tightly coupled architecture (e.g., independently compile an updated version of the source code of a given layer).

Some implementations of the current subject matter can enable independent handling of the various layers. The source code of the different layers can be independent of each other (e.g., compiled separately). Independent compilation can be achieved, for example, by storing the source code of different layers in separate repositories that can be independently compiled to generate independent packages. For example, each time a developer modifies the source code of a given layer, the modified source code can be compiled to generate a new/modified package that includes computer-executable code associated with the modified source code. The new package can be assigned a unique name and stored in a package repository. Storing the source code for different layers in different repositories can improve the manageability and maintenance of the source code in the various layers. For example, storing the source code of different layers in separate repositories can maintain the integrity of source codes of the different layers when modifications are made to the source code of a given layer. In other words, if a user is modifying the source code of a given layer, modifications to source code of a different layer stored in a second repository can be prevented (e.g., because the user may not have access to the second repository).

A container image can be generated that can include the various packages in the package repository (e.g., one package for each layer in the microservice). In some implementations, each time a source code of a layer is compiled (e.g., after a modification has been committed) to generate a new package, a new container image that includes the new package can be generated. The container image can include a microservice layer (e.g., included in the software architecture) that can facilitate communication between the various packages, and can serve as an external interface (e.g., handle requests from users). The new container image can be deployed and executed (e.g., in distributed compute nodes).

Figure 2:
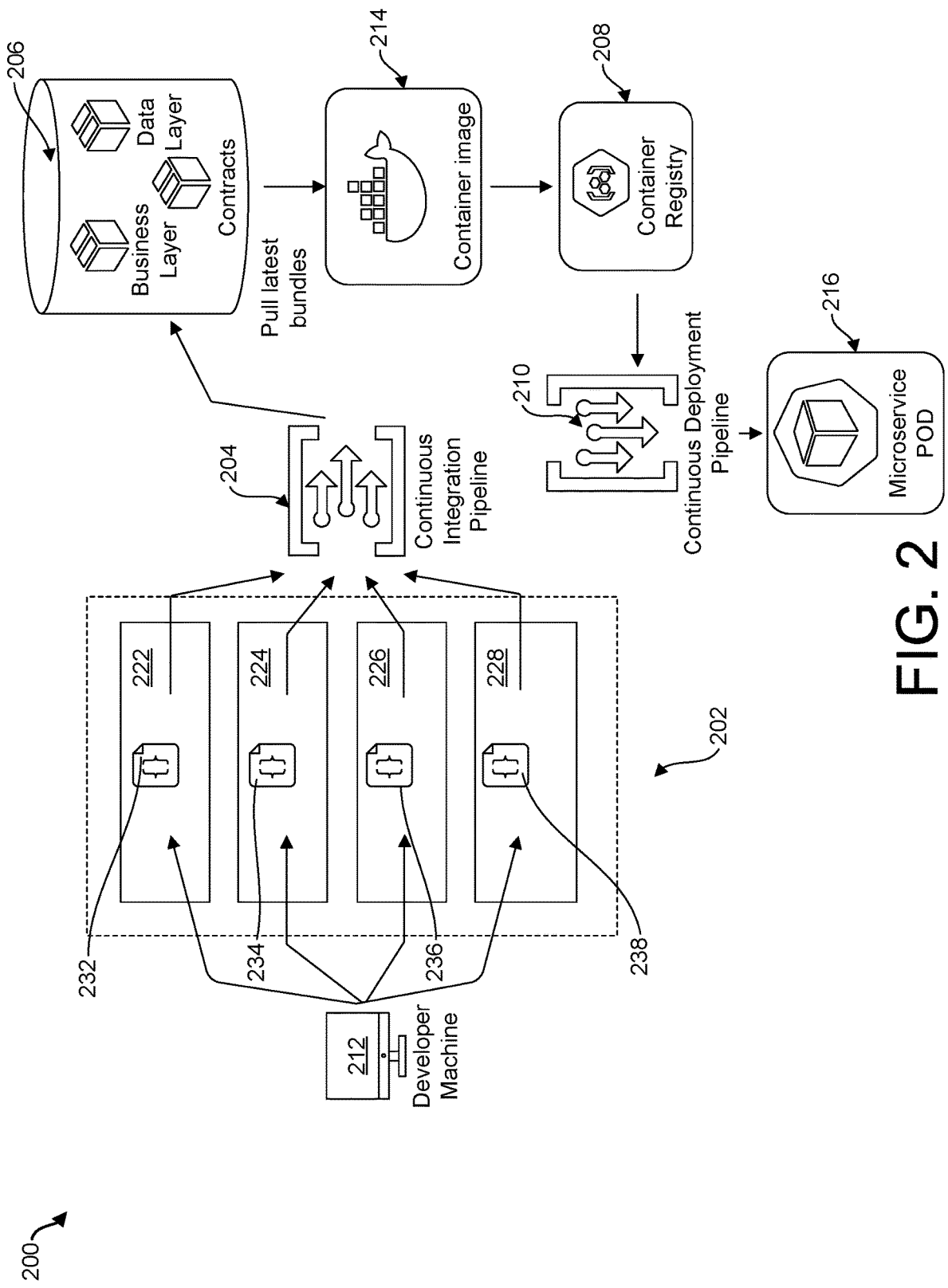
FIG. 2 illustrates an exemplary framework for generating and deploying the modified container image.

FIG. 1 is a flow chart of an exemplary method for generating a modified container image based on modification to a layer of a software architecture. At step 102, data characterizing a notification indicative of modification to a first source code can be received. The first source code can be included in a first layer of a software architecture. The first layer can be stored in a first repository of a plurality of repositories of a microservice architecture. FIG. 2 illustrates an exemplary microservice architecture 200 for generating and deploying a container image. The microservice architecture 200 includes an architecture layer repository 202 (e.g., multiple file storage locations), an integration pipeline 204, a package repository 206, container registry 208 and a deployment pipeline 210. The architecture layer repository 202 can include multiple repositories (e.g., multiple file/source code storage locations) that can store the different layers of the software architecture. The various repositories can be configured to store the source code of the layers (e.g., each layer repository can store the source code of a unique layer).

As illustrated in FIG. 2, the architecture layer repository 202 can include a first repository 222, a second repository 224, a third repository 226, and a fourth repository 228. A software architecture can be developed and executed on the microservice architecture 200. The software architecture can include multiple layers where each layer can include a source code. Layers of the software architecture (e.g., source codes of the layers) can be stored in the different repositories, and the source codes can be independently compiled. For example, source codes of the different layers may be loosely coupled (e.g., source codes pass dependencies externally instead of being hard-coded). Loose coupling and/or storage of source codes of different layers in different repositories can allow for independent compilation of the source codes and generation of the corresponding packages.

In some implementations, the software architecture can include a contract layer 232 stored in the first repository 222; a data access layer 234 stored in the second repository 224; a business layer 236 stored in the third repository 226; and a microservice layer 238 stored in the fourth repository 228. In some implementations, the contract layer 232 can define interfaces, provide API declarations and fix contracts for communications. In some implementations, data access layer 234 can allow for creating, retrieving, updating and deleting operations. In some implementations, the business layer 236 can represent the part of the software architecture that implements logic. For example, it can be responsible for retrieving data and converting it into meaningful concepts for the software architecture (e.g., tasks such as processing, validating, associating, etc., associated with handling data). In some implementations, the microservice layer can handle user requests (e.g., requests from a developer computing device 212), and render a response to the user (e.g., with the aid of the business layer 236 and/or the data access layer 234).

When the source code (e.g., the first source code) in one of the layers (e.g., contract layer 232, data access layer 234, business layer 236, etc.) is modified (e.g., by a developer computing device 212), data characterizing a notification indicative of modification to the source code can be transmitted (e.g., by the architecture layer repository 202) and received by the integration pipeline 204. Returning to FIG. 1, at step 104, a package (e.g., a modified first package) including a computer-executable code (e.g., a first computer-executable code) can be generated by at least compiling the source code (e.g., the first source code of one of the contract layer 232, the data access layer 234, the business layer 236, etc.). For example, the integration pipeline 204 can retrieve the source code from the architecture layer repository 202 after receiving the notification at step 102 (e.g., from the architecture layer repository 202), and compile the source code to generate the computer-executable code. The integration pipeline 204 can generate the package that includes the computer executable code generated at step 104. The package can further include library code needed to execute the computer-executable code in the package. In some implementations, the library code can allow for execution of the computer-executable code in the package by a computing device or a distributed computing system (e.g., a kubernetes cluster, elastic container service, etc.) without the need for additional prerequisite software.

In some implementations, the integration pipeline 204 can assign a unique name (e.g., a unique first name) to the package generated at step 104. The assigned unique name can be indicative of a change made to the source code that triggered the notification at step 102, the identity of the integration pipeline 204 and a unique number generated (e.g., by the integration pipeline 204) when the integration pipeline 204 receives the notification at step 102. The unique name assigned to the package can allow for identifying the generated package. In some implementations, the unique name can have three components separated by "." (e.g., A.B.CDE). The first component ("A") can be indicative of a change in the name of a function in the source code (e.g., API breaking change). The second component ("B") can be indicative of a changes the source code that may not affect the existing functionality of the source code (e.g., addition of a new function to the source code, creating of a new API, etc.). The third component ("CDE") can include a unique number generated when the integration pipeline 204 receives the notification at step 102.

Returning to FIG. 1, at step 106, an instruction can be transmitted (e.g., by the integration pipeline 204) to the repository manager of the package repository 206 to store the package (e.g., the modified first package with the assigned first name) in the package repository 206. The repository manager can control the operation of the package repository 206. For example, the repository manager can store data files (e.g., packages) on the package repository 206 (e.g., based on an external instruction/request). The repository manager can retrieve data files from the package repository 206. Upon receiving the instruction, the repository manager can store the package generated by the integration pipeline 204 at step 104. The package repository 206 can be configured to store packages associated with the plurality of layers. In some implementations, the package repository 206 can store multiple packages for a given layer of the software architecture. For example, each time the source code of a layer has been modified, a new modified package can be generated and stored in the package repository 206. In some implementations, the package repository 206 can replace the previous version of the package of a given layer with a new version of the package indicative of the latest changes to the source code of the given layer.

At step 108, a container image 214 (e.g., a modified container image) that includes multiple packages in the package repository 206 can be generated by the integration pipeline 204. In some implementations, the container image 214 can include packages associated with multiple layers of the software architecture. The container image 214 can include a package for each layer in the software architecture. Additionally, the container image 224 can include the package (e.g., the modified first package) generated at step 104. In some implementations, the integration pipeline 204 can be configured to select the newest package for each layer of the software architecture (e.g., the most recently generated package for each of the layers). In some implementations, the packages can be selected by a user (e.g., via the developer computing device 212). For example, the integration pipeline 204 can present a list of packages stored in the package repository 206 to the user, and the user can select the packages to be included in the container image 214 (e.g., a package for each of the layers in the software architecture). The integration pipeline 204 can receive data characterizing the user selection of the packages and generate a container image that includes the selected packages.

The container image 214 can be stored in the container registry 208. The integration pipeline 204 can generate a unique identifier associated with the container image 214 that can be used to deploy the container image 214. For example, the unique identifier can be used to retrieve the container image 214 form the container registry 208. The unique identifier can be provided to a user (e.g., via the computing device 212). The user can request the deployment of the container image 214 by providing the unique identifier to the deployment pipeline 210. The deployment pipeline 210 can retrieve the container image 214 from the container registry 208 and deploy the container image 214 on a computing device or a distributed computing system (e.g., a kubernetes cluster).

In some implementations, the deployment pipeline 210 can receive data characterizing deployment parameters associated with the deployment of the container image 214 (e.g., deployment on a plurality of compute nodes of a distributed computing system) from a user. The deployment parameters can include the computing resources of the distributed computing system needed to execute the computer-executable codes of the various layers in the packages in the container image 214. For example, the deployment parameters can include one or more of the compute nodes (e.g., processors/processing resources), data storage capacity, RAM, etc. that are needed to execute the computer-executable codes. Based on deployment parameters, the deployment pipeline 210 can allocate the computing resources of the distributed computing system.

In some implementations, the deployment pipeline 210 can deploy or generate a microservice pod 216 associated with the container image 214. The deployment pipeline 210 can retrieve the container image 214 from the container registry 208 and generate the microservice pod 216 based on the retrieved container image 214 and the received deployment parameters. The microservice pod 208 can be configured to execute the computer-executable code in the container image 214 (e.g., on a distributed computing system based on the deployment parameters).

In some implementations, the container image 214 can include a microservice layer including a microservice source code configured to execute the source codes in the various packages in the container image 214. The integration pipeline 204 can store the microservice layer (e.g., stored in the fourth repository 228 of the architecture layer repository 202). The microservice layer can allow for communication between one or more packages in the container image 214 (e.g., between modified first package and other packages in the container image 214).

In some implementations, each time source code of a layer (e.g., second source code of a second layer) stored in the architecture layer repository 202 is modified (e.g., by the developer computing device 212), steps 102-108 described above can be repeated. For example, a new package (e.g., modified second package) with the computer-executable code of the aforementioned source code can be generated. The integrated pipeline 204 can retrieve the modified source code, compile the source code and generate the new package (e.g., as described in steps 102 and 104 above). The integrated pipeline 204 can transmit instructions to the repository manager of the package repository 206 to store the new package (e.g., the modified second package with the assigned second name) in the package repository 206 (e.g., as described in step 106 above). Additionally, a new container image (e.g., a second modified container image) that includes multiple packages in the package repository 206 can be generated (e.g., as described in step 108 above). In some implementations, the second modified container image can include the newest package for each layer of the software architecture (e.g., the modified first package and/or the modified second package).

In some implementations, source code can be human-readable code that can be written in program languages such as python, C++, etc. In some implementations, computer-executable codes can be machine-readable codes that can be generated by compiling one or more source codes. Computer-executable codes can be executed by operating systems (e.g., linux, windows, mac, etc.) of a computing device or distributed computing system. For example, computer-executable codes can include data needed to create runtime environment (e.g., binary machine code) that can be executed on the processors of the computing system or the distributed computing system.

Other embodiments are within the scope and spirit of the disclosed subject matter. For example, the prioritization method described in this application can be used in facilities that have complex machines with multiple operational parameters that need to be altered to change the performance of the machines. Usage of the word "optimize"/"optimizing" in this application can imply "improve"/"improving."

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a Read-Only Memory or a Random Access Memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A method comprising:
receiving data characterizing a notification indicative of a modification to a first source code of a first layer of a plurality of layers of a software architecture, wherein the first layer is stored in a first repository of a plurality of repositories of a microservice, wherein each layer in the plurality of layers comprises a software module and is configured for independent compilation within a respective repository by passing dependencies externally;
generating a modified first package comprising a first computer-executable code generated by at least compiling the first source code, assigning a unique first name to the modified first package indicative of the modification made to the first source code that triggered the notification;
transmitting an instruction to a repository manager of a package repository to store the modified first package with the unique first name in the package repository; and
generating a first modified container image integrating, using an integration pipeline, the modified first package and another package selected as a newest package of another layer of the software architecture, wherein the another package comprising another computer-executable code generated by at least compiling another source code of another layer of the software architecture, the another layer is different from the first layer, wherein the first modified container image comprises a microservice layer that facilitates communication between packages in the package repository, and wherein the microservice layer serves as an external interface for handling user requests and rendering a response to a user.

2. The method of claim 1, further comprising executing the first modified container image, wherein the microservice layer comprises a microservice source code configured to execute source codes in a plurality of packages in the first modified container image by at least communicating between one or more packages of the plurality of packages, the plurality of packages comprising the modified first package.

3. The method of claim 1, further comprising:
retrieving at least a second source code of a second layer of the plurality of layers;
generating a modified second package comprising a second computer-executable code generated by at least compiling the second source code and assigning a unique second name to the modified second package;
transmitting an instruction to the repository manager of the package repository to store the modified second package with the unique second name in the package repository; and
generating a second modified container image comprising the modified second package and the modified first package.

4. The method of claim 3, further comprising receiving second data characterizing a second notification indicative of modification to the second source code of the second layer of the software architecture.

5. The method of claim 4, wherein the software architecture comprises the plurality of layers comprising the first layer and the second layer, wherein the first layer is stored in the first repository of the plurality of repositories and the second layer is stored in a second repository of the plurality of repositories.

6. The method of claim 5, wherein the package repository is configured to store packages associated with each of the plurality of layers of the software architecture.

7. The method of claim 5, wherein source code of each of the plurality of repositories is configured to be independently compiled.

8. The method of claim 1, further comprising retrieving at least the first source code of the first layer.

9. The method of claim 1, wherein the software architecture is configured to be executed on a plurality of compute nodes.

10. A system comprising:
at least one data processor;
a memory coupled to the at least one data processor, the memory storing instructions to cause the at least one data processor to perform operations comprising:
receiving data characterizing a notification indicative of a modification to a first source code of a first layer of a plurality of layers of a software architecture, wherein the first layer is stored in a first repository of a plurality of repositories of a microservice, wherein each layer in the plurality of layers comprises a software module and is configured for independent compilation within a respective repository by passing dependencies externally;
generating a modified first package comprising a first computer-executable code generated by at least compiling the first source code, assigning a unique first name to the modified first package indicative of the modification made to the first source code that triggered the notification;
transmitting an instruction to a repository manager of a package repository to store the modified first package with the unique first name in the package repository; and
generating a first modified container image integrating, using an integration pipeline, the modified first package and another package selected as a newest package of another layer of the software architecture, wherein the another package comprising another computer-executable code generated by at least compiling another source code of another layer of the software architecture, the another layer is different from the first layer, wherein the first modified container image comprises a microservice layer that facilitates communication between packages in the package repository, and wherein the microservice layer serves as an external interface for handling user requests and rendering a response to a user.

11. The system of claim 10, wherein the operations further comprising executing the first modified container image, wherein the microservice layer comprises a microservice source code configured to execute source codes in a plurality of packages in the first modified container image by at least communicating between one or more packages of the plurality of packages, the plurality of packages comprising the modified first package.

12. The system of claim 10, wherein the operations further comprising:
   retrieving at least a second source code of a second layer of the plurality of layers;
   generating a modified second package comprising a second computer-executable code generated by at least compiling the second source code and assigning a unique second name to the modified second package;
   transmitting an instruction to the repository manager of the package repository to store the modified second package with the unique second name in the package repository; and
   generating a second modified container image comprising the modified second package and the modified first package.

13. The system of claim 12, wherein the operations further comprising receiving second data characterizing a second notification indicative of modification to the second source code of the second layer of the software architecture.

14. The system of claim 13, wherein the software architecture comprises the plurality of layers comprising the first layer and the second layer, wherein the first layer is stored in the first repository of the plurality of repositories and the second layer is stored in a second repository of the plurality of repositories.

15. The system of claim 14, wherein the package repository is configured to store packages associated with each of the plurality of layers of the software architecture.

16. The system of claim 14, wherein source code of each of the plurality of repositories is configured to be independently compiled.

17. The system of claim 10, wherein the operations further comprising retrieving at least the first source code of the first layer.

18. The system of claim 10, wherein the software architecture is configured to be executed on a plurality of compute nodes.

19. A computer program product comprising a non-transitory machine-readable medium storing instructions that, when executed by at least one programmable processor that comprises at least one physical core and a plurality of logical cores, cause the at least one programmable processor to perform operations comprising:
   receiving data characterizing a notification indicative of a modification to a first source code of a first layer of a plurality of layers of a software architecture, wherein the first layer is stored in a first repository of a plurality of repositories of a microservice, wherein each layer in the plurality of layers comprises a software module and is configured for independent compilation within a respective repository by passing dependencies externally;
   generating a modified first package comprising a first computer-executable code generated by at least compiling the first source code, assigning a unique first name to the modified first package indicative of the modification made to the first source code that triggered the notification;
   transmitting an instruction to a repository manager of a package repository to store the modified first package with the unique first name in the package repository; and
   generating a first modified container image integrating, using an integration pipeline, the modified first package and another package selected as a newest package of another layer of the software architecture, wherein the another package comprising another computer-executable code generated by at least compiling another source code of another layer of the software architecture, the another layer is different from the first layer, wherein the first modified container image comprises a microservice layer that facilitates communication between packages in the package repository, and wherein the microservice layer serves as an external interface for handling user requests and rendering a response to a user.

20. The computer program product of claim 19, wherein the operations further comprising executing the first modified container image, wherein the microservice layer comprises a microservice source code configured to execute source codes in a plurality of packages in the first modified container image by at least communicating between one or more packages of the plurality of packages, the plurality of packages comprising the modified first package.

21. The computer program product of claim 19, wherein the operations further comprising:
   retrieving at least a second source code of a second layer of the plurality of layers;
   generating a modified second package comprising a second computer-executable code generated by at least compiling the second source code and assigning a unique second name to the modified second package;
   transmitting an instruction to the repository manager of the package repository to store the modified second package with the unique second name in the package repository; and
   generating a second modified container image comprising the modified second package and the modified first package.

* * * * *